United States Patent

Tani et al.

(10) Patent No.: US 8,801,511 B2
(45) Date of Patent: Aug. 12, 2014

(54) AIR-CONDITIONING DUCT

(75) Inventors: Naoto Tani, Nagoya (JP); Hidetoshi Matsumoto, Anjo (JP); Hayato Kamigashima, Kariya (JP); Nobuhiro Ichimura, Kariya (JP)

(73) Assignees: Kyoraku Co., Ltd., Kyoto-shi, Kyoto (JP); Inoac Corporation, Nagoya, Aichi (JP); Toyota Shati Kabushiki Kaisha, Kariya-shi, Aichi (JP)

( * ) Notice: Subject to any disclaimer, the term of this patent is extended or adjusted under 35 U.S.C. 154(b) by 954 days.

(21) Appl. No.: 12/221,189

(22) Filed: Jul. 30, 2008

(65) Prior Publication Data

US 2009/0042503 A1 Feb. 12, 2009

(30) Foreign Application Priority Data

Jul. 31, 2007 (JP) .................................. 2007-199957

(51) Int. Cl.
*F24F 13/14* (2006.01)
*B60S 1/54* (2006.01)

(52) U.S. Cl.
USPC ............ 454/336; 454/121; 454/122; 454/339

(58) Field of Classification Search
USPC .................................. 138/109, 111, 115–117;
285/124.1–124.5, 188, 424; 403/234,
403/335–338; 454/10, 136, 137, 143, 144,
454/151, 156, 8, 148
See application file for complete search history.

(56) References Cited

U.S. PATENT DOCUMENTS

| 679,932 | A | * | 8/1901 | Abrahamson | 454/8 |
| 1,805,990 | A | * | 5/1931 | Makowski | 285/188 |
| 1,810,142 | A | * | 6/1931 | Makowski | 285/61 |
| 2,412,071 | A | * | 12/1946 | Warner et al. | 454/73 |
| 2,648,348 | A | * | 8/1953 | Robinson | 137/561 R |
| 2,649,742 | A | * | 8/1953 | Armstrong | 417/151 |
| 2,786,417 | A | * | 3/1957 | Lung | 417/82 |
| 3,319,705 | A | * | 5/1967 | Sandmann | 165/4 |
| 3,336,943 | A | * | 8/1967 | Roberts | 137/594 |
| 3,693,610 | A | * | 9/1972 | Ehrlichmann | 126/85 B |
| 3,693,664 | A | * | 9/1972 | Schmunk | 138/111 |
| 3,886,851 | A | * | 6/1975 | Berner | 454/192 |
| 3,901,275 | A | * | 8/1975 | Logsdon | 137/599.03 |

(Continued)

FOREIGN PATENT DOCUMENTS

DE 20 2007 012 988 3/2009
EP 2 020 317 2/2009

(Continued)

*Primary Examiner* — Steven B McAllister
*Assistant Examiner* — Helena Kosanovic
(74) *Attorney, Agent, or Firm* — Flynn, Thiel, Boutell & Tanis, P.C.

(57) ABSTRACT

An air-conditioning duct for vehicles with one duct mutually connected and fixed to the other duct is provided. One duct is formed by incorporating a first unit duct with a flange formed around an opening periphery thereof and a second unit duct with a flange formed around an opening periphery thereof in parallel. The other duct is formed by incorporating a third unit duct with a flange formed around an opening periphery thereof and a fourth unit duct with a flange formed around an opening periphery thereof in parallel. The flange formed on the boundary side of the second unit duct are fixed with one over another, and the flange formed on the boundary side of the third unit duct and the flange formed on the boundary side of the fourth unit duct are fixed with one over another.

4 Claims, 4 Drawing Sheets

(56) References Cited

U.S. PATENT DOCUMENTS

| | | | |
|---|---|---|---|
| 4,083,133 A * | 4/1978 | Ravesteyn et al. | 37/336 |
| 4,111,004 A * | 9/1978 | Blomberg | 62/476 |
| 5,000,480 A * | 3/1991 | Straka et al. | 280/756 |
| 5,062,354 A * | 11/1991 | Goins et al. | 454/237 |
| 5,078,432 A * | 1/1992 | Seiter | 285/124.3 |
| 5,282,456 A * | 2/1994 | Smelcer et al. | 126/85 B |
| 5,312,524 A * | 5/1994 | Barcomb | 202/177 |
| 5,398,554 A * | 3/1995 | Ogawa et al. | 73/861.357 |
| 5,444,947 A * | 8/1995 | Miller | 52/100 |
| 5,556,138 A * | 9/1996 | Nakajima et al. | 285/124.4 |
| 5,904,896 A * | 5/1999 | High | 422/4 |
| 6,000,278 A * | 12/1999 | Hystad | 73/46 |
| 6,406,066 B1 * | 6/2002 | Uegane | 285/124.1 |
| 6,488,314 B1 * | 12/2002 | Hutter | 285/124.1 |
| 6,776,704 B2 * | 8/2004 | Goncalves et al. | 454/8 |
| 2003/0176159 A1* | 9/2003 | Nakagawa et al. | 454/144 |
| 2005/0029806 A1* | 2/2005 | Yamanashi et al. | 285/124.1 |
| 2007/0184772 A1* | 8/2007 | McConnell et al. | 454/139 |
| 2008/0318514 A1* | 12/2008 | Fettkether | 454/330 |
| 2009/0042503 A1* | 2/2009 | Tani et al. | 454/156 |
| 2009/0042506 A1* | 2/2009 | Tani et al. | 454/339 |
| 2009/0083962 A1* | 4/2009 | Sandman et al. | 29/509 |
| 2010/0112928 A1* | 5/2010 | Iantorno | 454/271 |
| 2011/0000727 A1* | 1/2011 | Froeschle et al. | 180/68.1 |

FOREIGN PATENT DOCUMENTS

| | | | | |
|---|---|---|---|---|
| EP | 2020317 A2 * | 2/2009 | | B60H 1/00 |
| EP | 2020318 A2 * | 2/2009 | | B60H 1/00 |
| JP | 10329527 A * | 12/1998 | | |
| JP | 2004034832 A * | 2/2004 | | |
| JP | 2004-249826 | 9/2004 | | |
| JP | 2004249826 A * | 9/2004 | | |
| JP | 2009035079 A * | 2/2009 | | |
| JP | 2009035080 A * | 2/2009 | | |
| KR | 2010005918 A * | 1/2010 | | |

* cited by examiner

AIR-CONDITIONING DUCT

BACKGROUND OF THE INVENTION

1. Field of the Invention

The present invention relates to air-conditioning ducts for vehicles.

2. Description of the Related Art

Conventional box-shaped minivan, station wagon and the like having large passenger compartment space are provided with an air-conditioning unit not only in the front part of a vehicle but also in the rear part of the vehicle in order to achieve uniform air-conditioning of the whole vehicle.

Such an air-conditioning unit provided in the rear part of the vehicle is generally embedded in the inside of one of the side walls of the rear passenger compartment.

Air-conditioning air passes under the floor or through the ceiling, and is uniformly supplied to backseats on both sides through air-conditioning ducts provided along roof sides or side trims on both sides.

In general, space to dispose air-conditioning ducts is restricted by design and limited in space due to relationship with other parts.

Moreover, air-conditioning ducts are connected by sequentially splicing subdivided unit ducts corresponding to each unit for reasons relating to molding or assembly of each unit of vehicles.

Furthermore, there are techniques to connect a plurality of ducts to an air-conditioning unit to provide a first ventilation flue and a second ventilation flue in order to supply air-conditioning air supplied from the air-conditioning unit to intended positions (See, for example, JP. A. 6-106956)

Moreover, unit ducts are connected by forming a flange at the end of each duct body, and connecting the formed flanges via a seal material as described in JP. A. 2004-249826.

Use of this method allows connecting ducts by fitting one duct over another duct, achieving easy connection of unit ducts even when the connection of ducts must be performed at a place that cannot be visually monitored when assembling vehicle units.

However, when incorporating the air-conditioning ducts in parallel to form a first ventilation flue and a second ventilation flue, better blowing efficiency of the first ventilation flue and the second ventilation flue through which air-conditioning air passes in a predetermined space to dispose air-conditioning ducts, and better airtightness at connection parts of the air-conditioning ducts is difficult to achieve at the same time.

In other words, in a case of supplying each side of the rear seat of a vehicle with air-conditioning air with different temperatures from the air-conditioning unit, the air-conditioning unit must be provided with a duct at each supply outlet of the air-conditioning unit with, for example, one duct extended to the right-side seat, while the other duct extended to the left-side seat.

In this case, between the position to branch the ducts towards the seats on both sides and the supply outlet of the air-conditioning unit, each duct will form a first ventilation flue and a second ventilation flue incorporated in parallel. Providing a joining section to connect ducts in the above-mentioned area poses the following problem.

When connecting incorporated unit ducts 100 and 101 to other incorporated unit ducts 100 and 101, the ducts are provided with flanges 102 at their ends, and contacted via a seal material 300. As shown in FIG. 4 and FIG. 5, if the seal material 300, such as a packing, is wound without providing a flange at a boundary wall T of both ducts incorporated for better blowing efficiency, enough sealing property cannot be obtained since the boundary wall T is but-jointed.

That is, air-conditioning air in one ventilation flue flows into the other ventilation flue through the gap generated at the joining section, causing, what is called, an air leakage phenomenon.

As a result, the air-conditioning air flowing through the first ventilation flue S1 and the air-conditioning air with a different temperature flowing through the second ventilation flue S2 are mixed to cause lower thermal efficiency.

The present invention was developed to solve the above-mentioned problem. That is, an object of the present invention is to provide an air-conditioning duct with excellent blowing efficiency which does not cause an air leakage phenomenon when air-conditioning ducts are connected and fixed.

SUMMARY OF THE INVENTION

The present inventors have made keen studies based on the above-mentioned background, and found that the above-mentioned subject can be solved by fitting a part of a flange formed around a periphery of a first unit duct that forms an air-conditioning duct over a part of a flange formed around a periphery of a second unit duct that forms the air-conditioning duct and is incorporated with the first unit duct for connection and fixation, and as a result, have completed the present invention based on the findings.

The present invention relates to an air-conditioning duct for vehicles formed by mutually connecting one duct to other duct, wherein one duct is formed by incorporating in parallel a first unit duct with a flange formed around an opening periphery thereof and a second unit duct with a flange formed around an opening periphery thereof, and the other duct is formed by incorporating in parallel a third unit duct with a flange formed around an opening periphery thereof and a fourth unit duct with a flange formed around an opening periphery thereof, wherein the flange formed on the a boundary side of the first unit duct and the flange formed on the boundary side of the second unit duct are fixed with one over the other, and the flange formed on the boundary side of the third unit duct and the flange formed on the boundary side of the fourth unit duct are fixed with one over the other.

A "boundary side" means an edge that is a part of peripheries of an opening of a unit duct, and that is adjust to a unit duct to be incorporated.

The present invention also relates to an air-conditioning duct, wherein a flange formed on the boundary side of the first unit duct, the second unit duct, the third unit duct, and the fourth unit duct is an outer flange.

The present invention also relates to an air-conditioning duct, wherein a flange formed on the boundary side of the first unit duct is an outer flange, a flange formed on the boundary side of the second unit duct is an inner flange, a flange formed on the boundary side of the third unit duct is an outer flange, and a flange formed on the a boundary side of the fourth unit duct is an inner flange.

The present invention also relates to an air-conditioning duct, wherein a cross-section area of the first unit duct is larger than that of the second unit duct, a cross-section area of the third unit duct is larger than that of the fourth unit duct, and when connecting one duct with another duct, the first unit duct and the third unit duct are connected, and the second unit duct and the fourth unit duct are connected.

The present invention also relates to an air-conditioning duct, wherein the one duct and the other duct are connected with a seal material.

Combination of the above-mentioned inventions can be appropriately employed without exceeding the object of the present invention.

An air-conditioning duct in accordance with the present invention comprises one duct having a first unit duct and a second unit duct, and another duct having a third unit duct and fourth unit duct connected with each other, wherein a flange is formed around a periphery of an opening of the first unit duct, the second unit duct, the third unit duct, and the fourth unit duct.

The flange formed on the boundary side of the first unit duct and the flange formed on the boundary side of the second unit duct are fixed with one over another, and likewise, the flange formed on the boundary side of the third unit duct and the flange formed on the boundary side of the fourth unit duct are fixed with one over another.

The part with flanges overlapped has an area to stably attach a seal material large enough to prevent an occurrence of a leakage phenomenon.

Therefore, when one duct and the other duct in accordance with the present invention are connected, the air leakage phenomenon does not occur.

In addition, the part fixed by the flanges on the boundary side overlapped has higher rigidity, and therefore is difficult to be damaged.

Therefore, the incorporated state of the first unit duct and the second unit duct, or the third unit duct and the fourth unit duct is firmly maintained.

When flanges formed on the boundary side of the first unit duct, the second unit duct, the third unit duct, and the fourth unit duct are outer flanges, the flanges do not project inside of the duct, and therefore, do not disturb flow of air-conditioning air flowing through the duct.

When the flange formed on the boundary side of the first unit duct is an outer flange, and the flange formed on the boundary side of the second unit duct is an inner flange, the size of one duct can be reduced since the first unit duct and the second unit duct can be incorporated without a gap.

When the flange formed on the boundary side of the third unit duct is an outer flange, and the flange formed on the boundary side of the fourth unit duct is an inner flange, the size of the other duct can be reduced from the same reason as mentioned above.

As a result, when the size of the space capable of disposing one duct (the other duct) is already decided by design, the size of a ventilation flue can be maximized.

When the cross-section area of the first unit duct is formed larger than that of the second unit duct, the pressure loss per unit length of the unit duct in the first unit duct is smaller than that in the second unit duct. The same holds for the third unit duct and the fourth unit duct.

Therefore, an air-conditioning duct formed with the first unit duct and the third unit duct are taken as air-conditioning ducts extending to the roof side opposite to the side in which the air-conditioning unit is embedded, thereby the effect of pressure loss on the air-conditioning air can be reduced.

DESCRIPTION OF THE PREFERRED EMBODIMENTS

First Embodiment

An embodiment of the present invention will be described with reference to the drawings.

Figure 1:
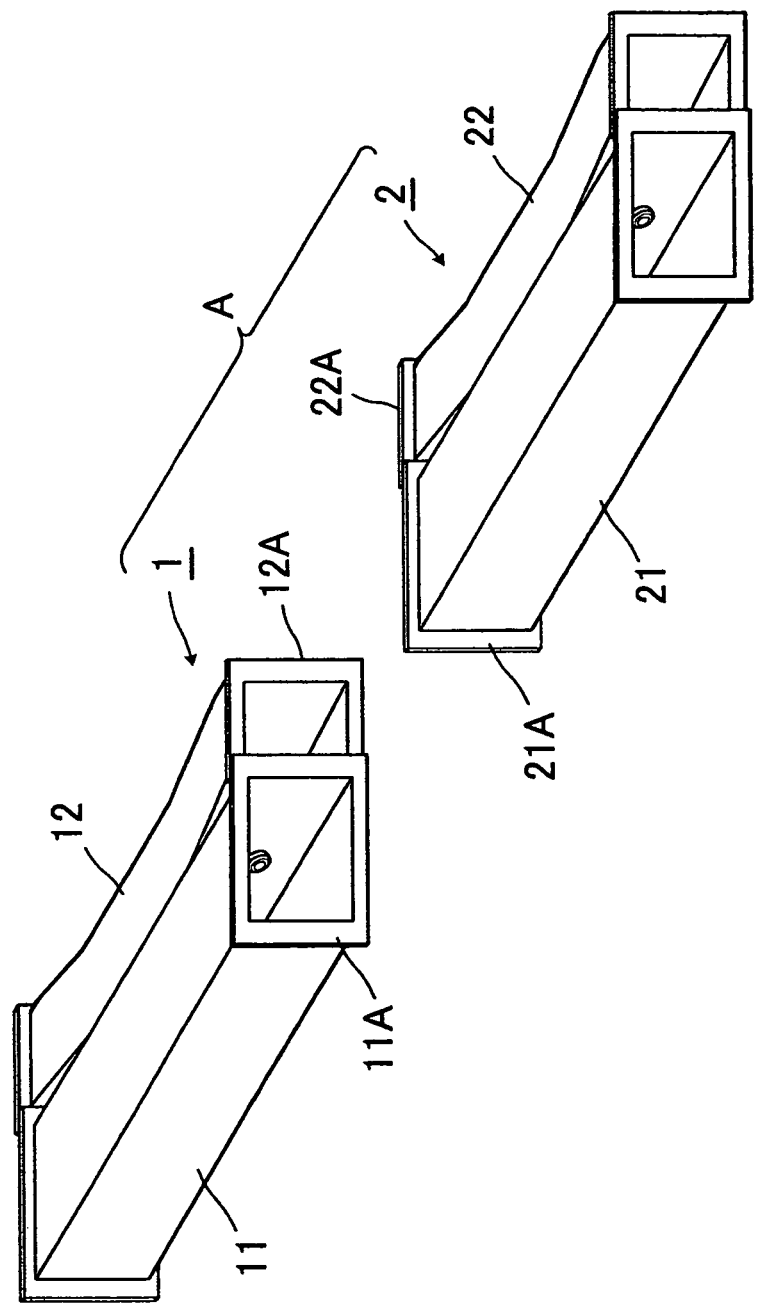
FIG. 1 is a perspective view showing an air-conditioning duct in accordance with the first embodiment.

FIG. 1 is a perspective view showing an air-conditioning duct according to the present embodiment.

As shown in FIG. 1, an air-conditioning duct A of the present embodiment includes one duct 1 (hereinafter referred to as a "front duct"), other duct 2 (hereinafter referred to as a "rear duct") connected with each other.

The front duct 1 includes a first unit duct (hereinafter referred to as a "first small duct") 11 and a second unit duct (hereinafter referred to as a "second small duct") 12 incorporated in parallel with the first small duct 11. The opening of the first small duct 11 is formed larger than that of the second small duct 12.

The rear duct 2 includes a third unit duct (hereinafter referred to as a "third small duct") 21 and a fourth unit duct (hereinafter referred to as a "fourth small duct") 22 incorporated in parallel with the third small duct 21.

The size and shape of an opening of the third small duct 21 are the same as those of the first small duct 11 for interconnection, and likewise, the size and shape of an opening of the fourth small duct 22 are the same as those of the second small duct 12.

The openings of the front duct 1 and the rear duct 2 are formed in inclining manner.

That is, the opening of the first small duct 11 inclines at a predetermined angle with respect to the longitudinal direction, and the opening of the second small duct 12 also inclines at a predetermined angle in the longitudinal direction.

The gradient angle of the opening of the first small duct 11 and that of the second small duct are equal.

Likewise, the opening of the third small duct 21 and that of the fourth small duct 22 also inclines at a predetermined angle in the longitudinal direction, and their gradient angles are equal.

The gradient angle of the opening of the third small duct 21 (or the fourth small duct 22) corresponds to that of the opening of the first small duct 11 (or the second small duct 12).

In addition, the opening periphery of the first small duct 11 and the opening periphery of the second small duct 12 are formed with flanges 11A and 12A, and likewise, the opening periphery of the third small duct 21 and the opening periphery of the fourth small duct 22 are formed with flanges 21A and 22A.

The flange 11A, flange 12A, flange 21A, and flange 22A are outer flanges projecting outwardly from the ventilation flue; therefore, the flanges do not project inside the ventilation flue, and do not disturb flow of air-conditioning air flowing through the ventilation flue.

As shown in FIG. 1, the flange 11A formed on the boundary side of the first small duct 11 and the flange 12A formed on the boundary side of second small duct 12 are fixed with one over another (the part with these flanges overlapped is referred to as a "front overlapping flange part").

The flange 21A formed on the boundary side of the third small duct 21 and the flange 22A formed on the boundary side of the fourth small duct 22 are also fixed with one over another (the part with these flanges overlapped is referred to as a "rear overlapping flange part.")

Figure 2:
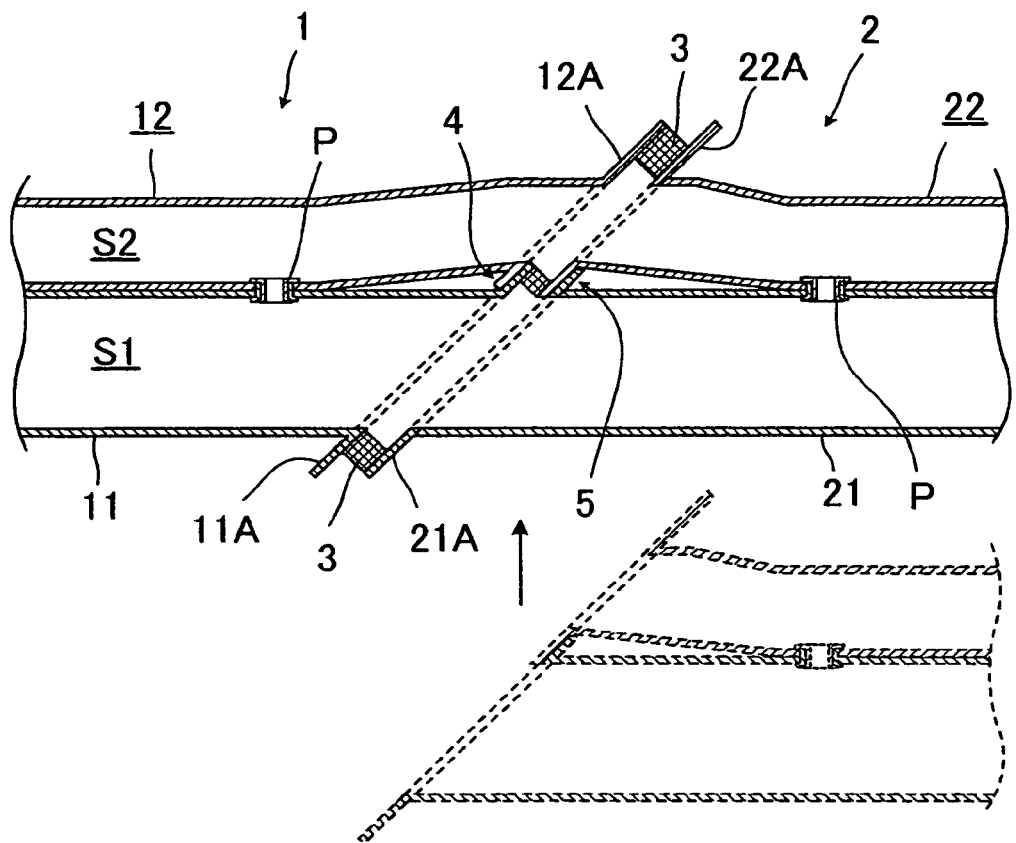
FIG. 2 is a cross sectional view showing a joining method of the air-conditioning duct according to the first embodiment.

FIG. 2 is a cross sectional view showing a joining method of the air-conditioning duct according to the present embodiment.

FIG. 2 is a cross sectional view of the front duct 1 and the rear duct 2 in FIG. 1 cut in the longitudinal direction, and observed in a perpendicular and upper direction.

In order to prevent a leakage of air-conditioning air from a joining section when the front duct 1 and the rear duct 2 are connected, a seal material 3 (for example, a packing made from urethane) is interposed therebetween.

That is, the flanges 11A of the first small duct 11 and the flanges 12A of the second small duct 12 are provided with the seal materials 3, and similarly, the flanges 21A of the third small duct 21 and the flanges 22A of the fourth small duct 22 are provided with the seal materials 3.

When the seal material is a packing made from foamed polyurethane, the seal material is adhered on the flange.

When connecting the rear duct 2 to the front duct 1, as shown with an arrow in FIG. 2, the rear duct 2 is moved in parallel in the direction perpendicular to the longitudinal direction of the front duct 1 to close toward the front duct 1, and the flange 11A is connected with the flange 21A with the seal material 3, and simultaneously, the flange 12A is connected with flange 22A via the seal material 3.

During this process, naturally, the front overlapping flange part 4 and the rear overlapping flange part 5 are also connected via the seal material 3. Here, the seal material 3 is crushed by each flange face to improve air-tightness of the joining section between the front duct 1 and the rear duct 2.

The front overlapping flange part 4 formed on the front duct 1 and the rear overlapping flange part 5 formed on rear duct 2 according to the present embodiment have a certain area to attach the seal material 3.

Therefore, the seal material 3 with sufficient size to ensure the sealing property between the front duct 1 and the rear duct 2 of the present embodiment can be provided in a stable state.

In addition, even if the front duct 1 and the rear duct 2 are connected out of alignment to some extent, an air leakage does not occur since the front overlapping flange part 4 and the rear overlapping flange part 5 have a certain area.

Furthermore, overlapping of flanges projecting to the boundary side of each of the small ducts as an overlapping flange part creates a large ventilation flue.

Accordingly, the air leakage phenomenon that occurs between a ventilation flue S1 formed with the first small duct 11 and third small duct 21 and a ventilation flue S2 formed with the second small duct 12 and fourth small duct 22 can be avoided, and at the same time, decline in the blowing efficiency at the joining section can be prevented.

By the way, the magnitude of the pressure loss generated within the air-conditioning duct is proportional to the length of the air-conditioning duct, and inversely proportional to the size of the cross-section area.

Therefore, when the cross-section area of the air-conditioning duct disposed in the roof side close to the embedded air-conditioning unit (hereinafter referred to as a "short-distance duct") and the cross-section area of the air-conditioning duct disposed in the roof side opposite to the embedded air-conditioning unit (hereinafter referred to as a "long-distance duct") are equal, since the long-distance duct is longer than the short-distance duct, if the blowdown pressure of the air-conditioning air is not set to be higher than a given value, the air-conditioning air having sufficient flow velocity for performing air-conditioning is not supplied from the long-distance duct.

However, continuous operation of the air-conditioning unit with a high blowdown pressure poses a possibility of shorter life of the air-conditioning unit.

In the air-conditioning duct according to the present embodiment, the cross-section area of the air-conditioning duct formed with the first small duct 11 and the third small duct 21 (that is, the cross-section area of the ventilation flue S1) is larger than that of the air-conditioning duct formed with the second small duct 12 and the fourth small duct 22 (that is, the cross-section area of ventilation flue S2.)

Therefore, by using the air-conditioning duct formed with the first small duct 11 and the third small duct 21 as a long-distance duct, the magnitude of the pressure loss generated in the long-distance duct is reduced, and use for the roof side opposite to the embedded air-conditioning unit can be achieved.

That is, the designed blowdown pressure needed to supply air-conditioning air can be reduced.

As a result, the longer life of the air-conditioning unit can be achieved compared with when using a long-distance duct having a cross-section area equal to that of a short-distance duct.

Second Embodiment

Figure 3:
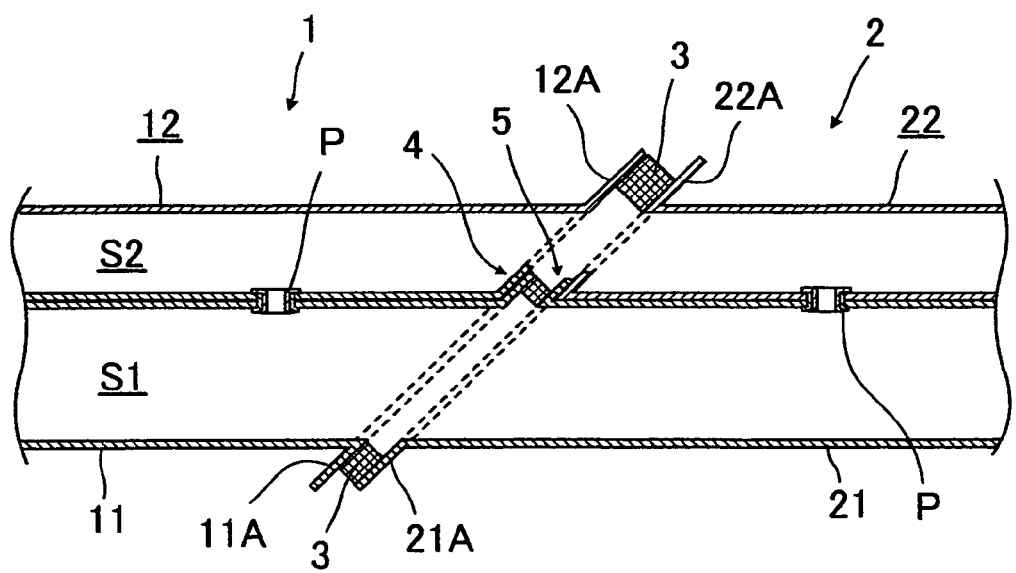
FIG. 3 is a cross sectional view showing a state in which a front duct and a rear duct are connected and fixed according to the second embodiment.
Figure 4:
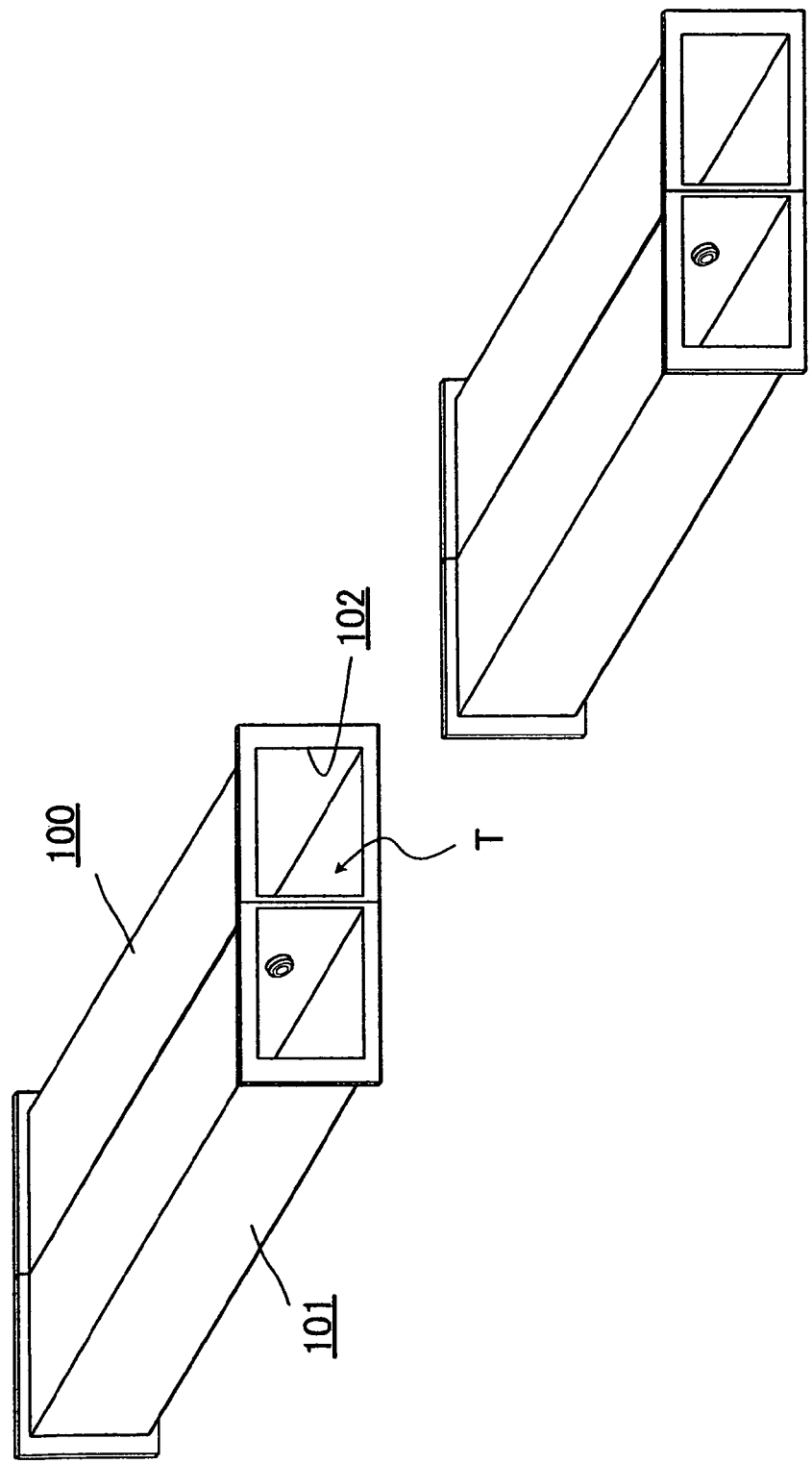
FIG. 4 is a perspective view showing a comparative example concerning a joining structure of an air-conditioning duct.
Figure 5:
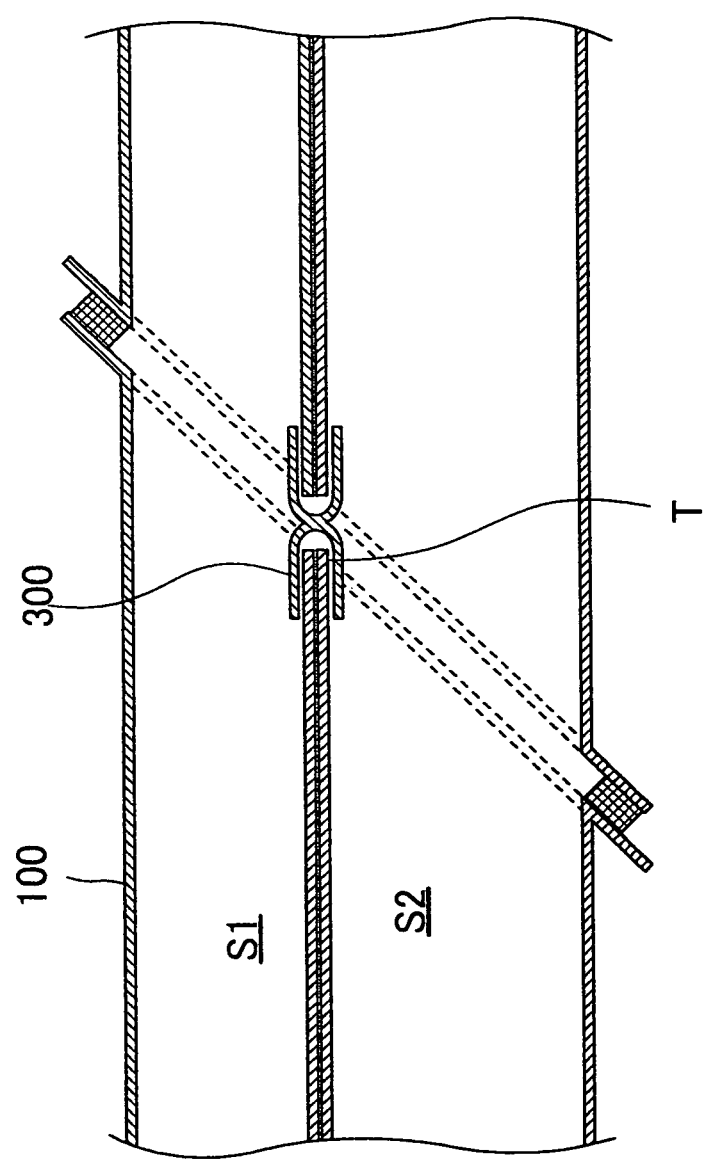
FIG. 5 is a cross sectional view showing a joining structure of the air-conditioning duct of FIG. 4.

FIG. 3 is a cross sectional view showing a state in which a front duct and a rear duct according to the second embodiment are connected.

An air-conditioning duct A according to the second embodiment differs from the air-conditioning duct A according to the first embodiment in that, as shown in FIG. 3, a flange 12A formed on a boundary side of a second small duct 12 and a flange 22A formed on a boundary side of a fourth small duct 22 are inner flanges projecting to the ventilation-flue side.

By taking the flange 12A formed on the boundary side of the second small duct 12 as an inner flange, and the flange 11A formed on the boundary side of the first small duct 11 as an outer flange, the first small duct 11 and the second small duct 12 can be incorporated without a gap.

Likewise, by taking the flange 22A formed on the boundary side of the fourth small duct as an inner flange, and the flange 21A formed on the boundary side of the third small duct 21 as an outer flange, the third small duct 21 and the fourth small duct 22 can be incorporated without a gap.

Formation of the flanges of the front duct 1 and the rear duct 2 as described above can maximize the size of the ventilation flue even when the disposition space of the front duct 1 and the rear duct 2 is restricted by design.

Therefore, the air-conditioning duct A according to the present embodiment is extremely suitable when emphasizing on spatial advantageous.

In addition, although the flanges 12A and 22A in accordance with this embodiment project to the ventilation flue S2, since ends thereof are set to face the downstream side of the ventilation flue, decrease of the pressure loss of the air-conditioning air can be minimized.

Although the present invention have been described as mentioned above, various modifications are possible without being restricted to these embodiments.

For example, the first small duct 11 and the second small duct 12 incorporated thereto are shown as separate parts fixed with a stopper (rivet etc.), theoretically, they can be a single part.

In that case, the flange 11A and the flange 12A on the boundary side, or the flange 21A and the flange 22A on the boundary side are formed with a single part.

In addition, the seal material is not limited to be an integrated part of the flange, such as a packing, but also can be a separate part as long as it can maintain the airtightness of the joining section of the duct.

What is claimed is:

1. An air-conditioning duct for vehicles comprising:
    a first duct formed by incorporating in parallel a first polygonal unit duct with a flange formed around an opening periphery thereof and a second polygonal unit duct with a flange formed around an opening periphery thereof; and
    a second duct mutually connected to the first duct, the second duct being formed by incorporating in parallel a third polygonal unit duct with a flange formed around an opening periphery thereof and a fourth polygonal unit duct with a flange formed around an opening periphery thereof,
    wherein the first duct and second duct are connected in series with one another, the flange formed on a boundary side of the first polygonal unit duct and the flange formed on a boundary side of the second polygonal unit duct overlap and are fixed with one another, the flange formed on a boundary side of the third polygonal unit duct and the flange formed on a boundary side of the fourth polygonal unit duct overlap and are fixed with one another, the openings of the first unit duct and the second unit duct are formed in an inclined manner with respect to the longitudinal direction of the first and second unit ducts, the openings of the third unit duct and the fourth unit duct are formed in an inclined manner with respect to the longitudinal direction of the second and third unit ducts and the flanges of each of the unit ducts are inclined at the same angle as the openings of the unit ducts, the flanges formed on the boundary side of the first unit duct, the second unit duct, the third unit duct, and the fourth unit duct are outer flanges, a cross-section area of the first unit duct is larger than that of the second unit duct, a cross-section area of the third unit duct is larger than that of the fourth unit duct and, when connecting the first duct with the second duct, the first unit duct and the third unit duct are connected and the second unit duct and the fourth unit duct are connected.

2. The air-conditioning duct according to claim 1, wherein the first duct and the second duct are connected with a seal material.

3. An air-conditioning duct for vehicles comprising:
    a first duct formed by incorporating in parallel a first polygonal unit duct with a flange formed around an opening periphery thereof and a second polygonal unit duct with a flange formed around an opening periphery thereof; and
    a second duct mutually connected to the first duct, the second duct being formed by incorporating in parallel a third polygonal unit duct with a flange formed around an opening periphery thereof and a fourth polygonal unit duct with a flange formed around an opening periphery thereof,
    wherein the first duct and second duct are connected in series with one another, the flange formed on a boundary side of the first polygonal unit duct and the flange formed on a boundary side of the second polygonal unit duct overlap and are fixed with one another, the flange formed on a boundary side of the third polygonal unit duct and the flange formed on a boundary side of the fourth polygonal unit duct overlap and are fixed with one another, the openings of the first unit duct and the second unit duct are formed in an inclined manner with respect to the longitudinal direction of the first and second unit ducts, the openings of the third unit duct and the fourth unit duct are formed in an inclined manner with respect to the longitudinal direction of the second and third unit ducts and the flanges of each of the unit ducts are inclined at the same angle as the openings of the unit ducts, the flange formed on the boundary side of the first unit duct is an outer flange, the flange formed on the boundary side of the second unit duct is an inner flange, the flange formed on the boundary side of the third unit duct is an outer flange, the flange formed on the boundary side of the fourth unit duct is an inner flange, a cross-section area of the first unit duct is larger than that of the second unit duct, a cross-section area of the third unit duct is larger than that of the fourth unit duct and, when connecting the first duct with the second duct, the first unit duct and the third unit duct are connected and the second unit duct and the fourth unit duct are connected.

4. The air-conditioning duct according to claim 3, wherein the first duct and the second duct are connected with a seal material.

* * * * *